March 23, 1971   M. K. HARRIS   3,572,215
SINGLE ACTING STEAM ENGINE
Filed June 26, 1969
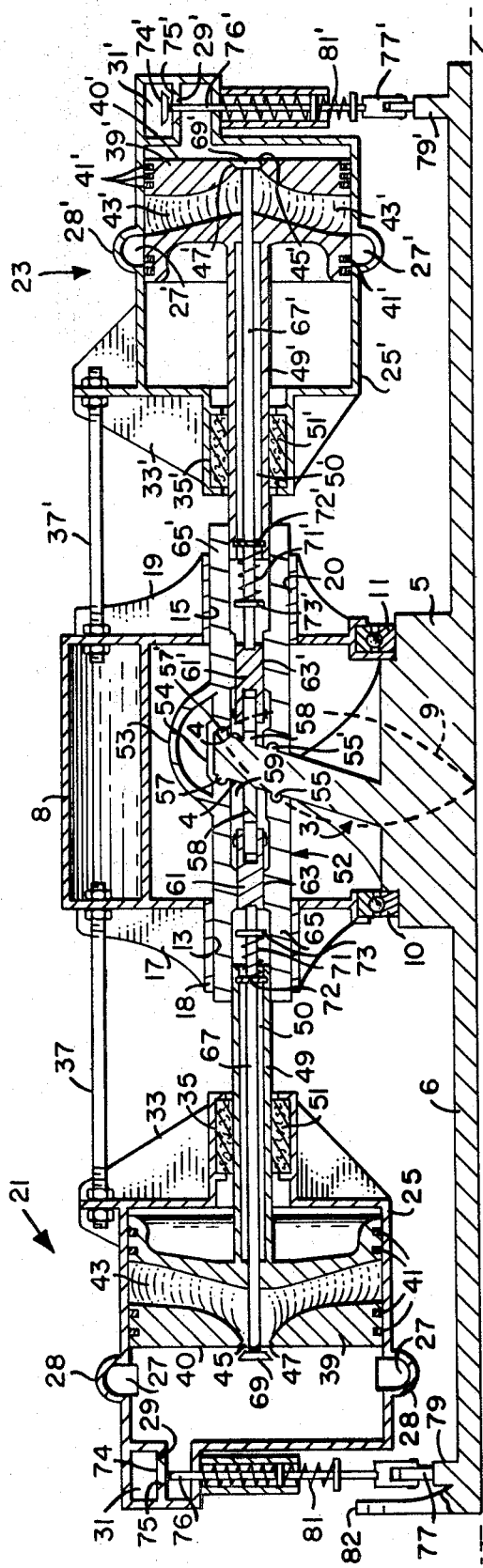
INVENTOR.
MARION K. HARRIS
BY Jack M. Wiseman
Thomas E. Schatzel
ATTORNEYS United States Patent Office 3,572,215
Patented Mar. 23, 1971

3,572,215
SINGLE ACTING STEAM ENGINE
Marion K. Harris, 14737 Charmeran Ave.,
San Jose, Calif. 95124
Filed June 26, 1969, Ser. No. 836,799
Int. Cl. F01b 13/04, 3/02; F15b 15/22
U.S. Cl. 91—480
18 Claims

ABSTRACT OF THE DISCLOSURE

A single acting steam engine wherein means are provided for auxiliary exhaust through the piston when the auxiliary exhaust poppet is open and the auxiliary exchange passages of the piston register with the exhaust ports in the cylinder wall. The opening and closing of the auxiliary exhaust poppet are responsive to the rate of reciprocation of the pistons. A multiple of said engines may be utilized in combination to provide a multiple cylinder power plant. The engines may be adapted to drive a swash plate drive.

BACKGROUND OF THE INVENTION

The present invention relates to a steam engine and more particularly to an improved single acting uni-flow swash plate steam engine.

Presently, there is considerable interest in providing improved engines for driving machinery. For example, in the automotive industry, there is considerable emphasis on providing an automobile power plant which does not generate significant atmospheric pollutants and has an operating efficiency comparable to or exceeding that of internal combustion engines.

SUMMARY OF THE PRESENT INVENTION

The present invention provides an improved single acting steam engine adaptable for powering automobiles and other vehicles. The structure may be compact and such that the hot and cool parts of the running engine are thermally isolated relative to each other. It furher provides for smooth operation over a wide speed range.

In an exemplary embodiment of a single steam engine of the present invention there is provided a compound engine. Each cylinder includes auxiliary exhaust occurring from within the cylinder chamber through the piston head when an auxiliary exhaust poppet valve carried by the head is open and the auxiliary exhaust passage integral within the piston head registers with an exhaust port leading from the cylinder chamber walls to the exterior. The auxiliary exhaust poppet valve is driven to serve as a slow closing valve to control the degree of opening near the end of the auxiliary exhaust passage during the exhaust step of the vapor cycle to produce wire drawing and effective early closing at high engine r.p.m. rates. This results in raising terminal compression pressure acting on the piston at the end of the compression stroke and cushions inertia loads at high speed. As the piston speed decreases, wire drawing decreases such that at low speed wire drawing is not as effective. This in turn provides a later effective closing of the exhaust poppet valve with no change in mechanical valve timing while reducing terminal compression pressures. Thus, at low speeds on short cut-off a smooth running engine is realized. The auxiliary exhaust valve responds to push rods joined thereto. The push rods respond to a cam generated on the thrust face of the output driven member which member in turn is responsive to the piston rod joining the piston. Thus, the exhaust valve control is a function of the output drive and piston speed.

In an exemplary compound steam engine embodiment, there is provided a pair of complementary cylinders. The pistons of the cylinders drive a power conversion means for converting the reciprocating motion of the pistons to rotary motion. The conversion means is illustrated in the form of a single acting swash plate driving an output drive member, e.g. a drive shaft. The piston rods are extended with a longitudinal control aperture incorporated within the piston rods and joined to a crosshead coupled to the swash plate and to cam followers responsive to a cam surface on the swash plate thrust face. The torsioned thrust face of the swash plate is straddled by the cylindrical crossheads for converting the reciprocating motion of the pistons to rotational motion to the output member. The swash plate tends to serve as a cam with one piston rod being pushed by the plate while the other pushes on the plate itself. Thus, as the pistons and the crossheads reciprocate, the swash plate and output drive shaft rotate. Simultaneously, the cam surface and cam follower respond to rotation of the swash plate to control opening and closing of the auxiliary exhaust valves carried by the piston head responsive to the engine speed. Thus, the auxiliary exhaust port opening and closing is a function of both the piston speed and position within the cylinder chamber. Proper choice of materials, tolerances and running clearances provide assurance that side scuff loads to the piston rods and pistons will be absorbed by the crossheads. The pistons themselves need not contact the cylinder walls. The piston ring material may be a self-lubricating material minimizing cylinder lubrication problems at high steam temperatures. The swash plate may engage a plurality of individual engines to provide a multiple cylinder power plant.

BRIEF DESCRIPTION OF THE DRAWINGS

FIG. 1 is a sectioned cross-sectional view of a dual piston, single-acting-swash-plate steam engine including the teachings of the present invention;

FIG. 2 illustrates a theoretical indicator diagram of the steam engine of FIG. 1; and FIG. 3 illustrates in perspective a multiple cylinder power plant incorporating a plurality of steam engines of FIG. 1.

DESCRIPTION OF THE PREFERRED
EMBODIMENTS

FIG. 1 illustrates a cross-sectional view of a compound (dual-piston), single-acting-swash-plate steam engine of the present invention and referred to by the general reference character 1. To convert the reciprocal motion of the pistons to rotary motion there is included a rotatable swash plate 3 having outer torsioned thrust surfaces 4 and a cylindrical hub 5 serving as a cam driving member for driving a revolvable drive member in the form of a revolvable output drive shaft 6. FIG. 1 illustrates a cross-sectional view taken at the center of the swash plate 3 and the output shaft 6. The plate 3 and shaft 6 revolve about a common axis 7. Though the plate 3 and output shaft 6 are illustrated as a unitary member it is to be understood that the plate and shaft may take other forms including individual segments coupled through gears for translating the rotational drive of the plate to the shaft. The swash plate 3 is secured within a swash plate casing 8. The casing 8 is adapted to accommodate the reciprocal action of the swash plate 3 resulting from the torsioned surfaces 4 of the plate and the "figure-eight" path the outer periphery of the surface takes. (See the broken line 9 illustrating one half of a path illustrative of all points on the outer periphery of one of the surfaces 4. Points on the other surface 4 assume a similar path.) A pair of combination radial and thrust bearings 10 and 11 are intermediate the hub segment 5 and the case 8 to provide rotary support of the hub 5 and minimize or eliminate the reciprocal motion from being translated to the output shaft 6. The casing 8 has a pair of central apertures 13 and 15 extending through opposite ends. The casing 8 supports a first support 17 having a central aperture coaxial with the aperture 13 and carrying a cylindrical guide 18 and a second mounting support 19 having a central aperture coaxial with the aperture 15 and carrying a cylindrical guide 20.

The compound engine 1 includes about opposite ends of the swash plate casing 8 a pair of cylinders referred to in general by the general reference characters 21 and 23, respectively. The cylinders 21 and 23 are remotely located relative to the swash plate 3 thereby permitting substantial isolation of the plate from high temperature steam operating within the cylinders 21 and 23. The cylinders 21 and 23 are of similar operation and structure except that the cylinder 21 is designed for low pressure relative to that of the cylinder 23 as illustrated by the differing cross-sectional areas. To facilitate the explanation, the common elements of the two cylinders 21 and 23 carry common reference numerals with the numerals of the cylinder 23 primed. The cylinder 21 includes a cylinder chamber casing 25 having a plurality of exhaust ports 27 extending through a longitudinal interior wall surface of the cylinder chamber to an exhaust jacket 28 surrounding the outer periphery of the casing 25. An inlet port 29 within the chamber casing 25 extends to a steam source in the form of a steam chest 31 so as to permit entrance of steam adjacent to the interior of bottom wall surface of the cylinder chamber 25. The inlet-exhaust arrangement provides for a uni-flow arrangement in which the steam flows through the interior of cylinder chamber 25 in one direction only—in the port 29 and out the port 27. The exterior or outer wall surface of the cylinder chamber casing 25 is secured to a rib mount 33 having a central aperture 35 coaxial with the axis of the chamber casing 25 and with the aperture 13 of the casing 8. A distance support rod 37 engages the rib mounts 33, the chamber casing 25 and the mounting support 17 to provide physical support between the cylinder chamber casing 25 and the swash plate casing 8.

Within the cylinder chamber casing 25 is a piston head 39 adapted for reciprocating movement within the chamber casing 25. The piston 39 has a working surface 40 which is the only surface contacted by the uni-flow steam. The piston head 39 has a circumference slightly less than the internal circumference of the cylinder chamber casing 25. The piston 39 carries a plurality of sealing rings 41 about its periphery to provide a steam seal intermediate the piston and chamber walls. The sealing rings 41 are preferably comprised of a graphite compound material for self-lubricating between the ring and chamber casing wall surfaces. Within the piston head 39 there is an auxiliary steam exhaust passage 43. The passage 43 is common to a central auxiliary port 45 opening at the working surface 40 and extends through the longitudinal wall surface of the piston 39. The head 39 is machined about the port 45 to form a valve seat 47. Accordingly, steam within the cylinder chamber 25 passes out through the exhaust port 27 as the port 27 is uncovered by the piston 39 or as the port 27 opens to the auxiliary passage 43 while the port 45 is open.

Joined to the piston 39 is a reciprocating piston rod 49 providing reciprocal motion responsive to the reciprocating motion of the piston head 39 within the chamber of the cylinder 25. The piston rod 49 has a longitudinal central cavity 50 and extends through the aperture 35 of the rib mount 33 and through the aperture 13 of the mounting support 17 joining the swash plate casing 8. Intermediate the aperture 35 and the rod 49 is provided a packing gland 51 to provide a hermetic seal to preclude air from entering within the chamber of the casing 25. Within the swash plate casing 8 the piston rods 49, 49' are coupled in common by a crosshead 52 having a crosshead yoke member 53. The yoke member 53 carries a coupling member 54 engaging the outer peripheral edge of the torsioned surfaces 4 of the swash plate 3 to control rotational alignment of the reciprocating members in their bores. The yoke member 53 also engages the thrust surfaces 4 of the swash plate 3 through a set of thrust bearings 55, 55', 57 and 57' each extending around the thrust surfaces 4. The swash plate 3 further carries an auxiliary exhaust cam 58, 58' of varying dimensions with each extending around one of the thrust surfaces 4. Aligned with the cams 58, 58' is a cavity 59 within which are positioned a pair of cam followers 61, 61' adapted to follow the cams 58, 58', respectively. The cam followers 61, 61', respectively protrude through an aperture 63, 63' within a cylindrical crosshead segment 65 of the crosshead 52. The cylindrical crosshead segment 65, 65' provides securement of the crosshead 52 to the rods 49, 49' by a pressure fit. Consequently, there is a unitary integral engagement and the crosshead 52 slides reciprocally within the guides 18 and 20. The tolerances of the segments 65, 65' and guides 18 and 20 are preferably selected to minimize lateral thrust of the crosshead 52 and the rods 49. As shown, the crosshead 52 is a unitary structure to impart the reciprocal motion to the thrust surfaces 4 of the swash plate 3. The plate responds by rotating about the central axis 7. The cam followers 61, 61' also respectively engage one longitudinal end of a stem 67, 67' of an auxiliary exhaust valve 69, 69' adapted to control opening of the ports 45, 45' and seat within the seats 47, 47'. A pair of bias spring members 71, 71' engage the valve stem 67, 67'. The springs 71, 71', respectively extend between a first stop 72, 72' supported by the rods 49, 49' and a second stop 73, 73' secured to the stems 67, 67'. The bias springs 71, 71' tend to bias the valves 69, 69' closed. As the swash plate 3 rotates and generates reciprocal motion due to the torsioned thrust surfaces 4 following the path 9, the cams 58, 58' act through the cam followers 61, 61' to control the position of the valves 69, 69' relative to their respective valve ports 45, 45'. Simultaneously, rotation of the swash plate 3 is dependent upon the position of the pistons 39, 39' within the cylinder chamber casings 25, 25'. The pistons 39, 39' are complementary such that the directions of their strokes are opposite relative to each other. Thus, when one is pushing on the swash plate the other is being pushed by the swash plate.

The steam inlet to the chamber casings 25, 25' is controlled by inlet valves 74 adapted to sit within a seat 75 formed about the aperture 29. The valve 74 carries a valve stem 76 engaging about its other terminal end a cam follower 77 engaging an inlet cam 79 carried by the output drive shaft 6. Surrounding the stem 76 intermediate the cam follower 77 and the valve 74 is a bias spring arrangement 81 adapted to bias the valve 74 in a closed position relative to the inlet port 29. Thus, the inlet steam supply from the steam chest 31 is regulated responsive to the output shaft 6 which also drives a power take off disc 82.

The structure of FIG. 1 is such that wire drawing action by the auxiliary exhaust valves 69, 69' provide a cushioning effect for the pistons 39, 39' at high speeds. Briefly, the wire drawing effect results as the poppet valves 69, 69' approach their seat and the associated piston is on the compression stroke. As the piston 39, 39' approaches the top of the cylinder chamber casing 25 the steam holding area within the chamber decreases. This tends to force the steam through the uncovered area of the exhaust port 45, 45' at a faster rate while the valve 69, 69' tends to close. Consequently, there is an increase in effective pressure within the chamber. The action of the exhaust valve 69, 69' is related to the piston speed such that at low speeds, the fluid (steam) is pushed out through the port 45, 45' slowly and the degree of cushioning less. The cam 59, 59' is selected such that the exhaust valve 69, 69' close on each cycle of their respective pistons 39, 39'.

FIG. 2 represents a diagrammatic indicator card of one cylinder of the engine of FIG. 1. The diagram illustrates the pressure P versus volume V of the cylinders and action of the exhaust valve 69, 69' within its respective cylinder. Steam is entered through the inlet port 29, 29' to the cylinder chamber casing 25, 25' during step a–b with point b representing the cut-off point at which the inlet valve 29, 29' closes. The step a–b is followed by an expansion or work step b–c. At point c, the piston 39, 39' uncovers the uni-flow exhaust port 27, 27' such that there is a further decrease in pressure to point d. At point d, the piston commences to compress the fluid within the cylinder chamber. The speed of the piston determines the path d–a and build up of pressure. At high speeds, the auxiliary exhaust valve 69, 69' is undergoing relatively high wire drawing and the pressure tends to build up relatively early in the exhaust stroke and builds up to a relatively high level as illustrated by the solid line d–f–a to provide cushioning. At lower speeds, the pressure builds up more gradually as illustrated by the partially broken line d–f'–a due to the fact that the exhaust valve 69, 69' is effectively open until it gets closer to its seat. At the low speed, compression begins later in the stroke and builds to a moderate level for smooth running. Upon reaching the point a the cycle is repeated.

As previously indicated, the cylinders 21 and 23 are complementary such that as rods 49, 49' move together either the inlet valve 73 or 73' is open to receive steam from the respective steam chest 31, 31'. As shown, if the valve 73' is open responsive to the cam 79' on the output shaft 6, steam enters the inlet port 29' to the interior of the cylinder 25'. At this point in the stroke the auxiliary exhaust valve 69' is closed and the piston 29' is at the extreme forward part of its stroke. The expansion of the steam then exercises force on the working surface 40' of the piston 29' causing it to "push" the piston rod 49' and swash plate 3. The auxiliary exhaust valve 69' is closed. The output shaft 5, the cams 79, 79' and the inlet valves 73, 73' respond as does the piston 39'. As the piston 39' moves to the rear, the main exhaust ports 27' are exposed commencing the step c–d. The piston 39 then changes direction and receives thrust from the swash plate on the compression stroke. The auxiliary passages 43' within the piston 39' comes into alignment with the ports 27'. Simultaneously, the cam 58' drives the cam follower 61' and the auxiliary exhaust valve 69' opens. As the piston nears the top of the compression stroke wire drawing commences as previously described, the inlet valve 29' opens and the cycle repeated. The cylinder 21 acts complementary to the cylinder 23 through the cycle.

As the pistons 39, 39' reciprocate, the crossheads 52, 52' follow. The swash plate 3 converts the reciprocal motion to rotary motion imparted to the drive shaft 6. Proper choice of materials and running clearances and tolerances will ensure that all side scuff loads will be absorbed by the crossheads 52, 52' and not imparted to any substantial degree to the rods 49, 49'. The pistons 39, 39' need not contact the wall of the cylinders 25, 25' but may be isolated by the piston seal rings 41, 41'. The material of the piston rings 41, 41' may be of a self-lubricating graphite base material to minimize lubrication problems at high steam temperatures.

The described embodiment provides thermal isolation of the hot and cool parts of the operating engine in various ways. Utilization of the uni-flow engine type, relatively long trunk pistons 39, 39', and by mounting the hot working cylinders 21 and 23 remote from the swash plate casing 8 on the distance support rods 39, 39' all aid in the isolation. As a result, steam condensation in the chambers of the operating cylinder can be substantially eliminated. The swash plate components also may be lubricated with conventional low temperature lubricants.

FIG. 3 illustrates diagrammatically in perspective a swash plate drive power plant referred to by the general reference character 90, incorporating four compound engines 1. The various elements common to FIG. 1 carry the same reference numerals.

The four engines 1 are evenly spaced, i.e. ninety degrees apart so as to be equally spaced about the swash plate 3 within the casing 8. The drive shaft 6 is coaxial with the casing 8 and toroidal shaped steam chest 31, 31'. Thus, FIG. 1 may be viewed as a cross-section taken along the line 1—1 to the center line 7. Obviously, depending on the particular application, the power plant 90 may include a select number of engines 1.

What is claimed is:

1. A steam power engine comprising, in combination:
   a source of steam;
   a first cylinder forming a chamber and formed with an exhaust port communicating with said chamber;
   a first inlet valve communicating with said source of steam and said chamber for controlling the passage of steam into said chamber;
   a first piston disposed within the chamber of said first cylinder, said first piston being formed with an internal auxiliary exhaust passage opening adjacent to a working surface of said first piston and opening adjacent to a piston surface adjacent to an interior wall surface forming the chamber of said first cylinder, said auxiliary exhaust passage registering with said exhaust port of said first cylinder during a part of the stroke of said first piston within said first cylinder;
   an auxiliary exhaust valve disposed within said chamber and seated on said first piston for controlling the passage of exhaust through said auxiliary exhaust passage of said first piston;
   power conversion means operatively responsive to the movement of said first piston for converting the reciprocating motion of said first piston to a rotary motion; and
   first auxiliary valve actuating means actuated in response to the movement of said power conversion means for operating said auxiliary exhaust valve in response to the rate of reciprocation of said first piston for controlling the passage of exhaust through said auxiliary exhaust passage of said first piston.

2. The engine of claim 1 in which the first inlet valve responds to the rate of reciprocation of the first piston.

3. An engine as claimed in claim 1 and comprising output drive shaft means and in which said power conversion means is in the form of a swash plate and connected to said output drive shaft means for imparting rotation thereto.

4. The engine of claim 3 in which the swash plate includes a cam surface adapted for controlling the action of the auxiliary exhaust valve actuating means.

5. The engine of claim 4 in which the output drive shaft means is adapted for controlling the action of the first inlet valve means.

6. The engine of claim 5 in which the first piston engages intermediate piston rods extending from the first piston to crosshead means engaging said swash plate.

7. The engine of claim 6 in which the output drive shaft means carries cam member means extending to and controlling actuation of the first inlet valve.

8. The engine of claim 6 in which the crosshead means and swash plate means are included in an integral output drive housing remote from the first cylinder.

9. The engine of claim 8 further including guide sleeve means for guiding the crosshead means and minimizing side thrust on the piston rods.

10. The engine of claim 1 further including:
   a second cylinder forming a chamber and formed with an exhaust port communicating with said chamber;
   a second inlet valve communicating with said source of steam and said chamber of said second cylinder for controlling the passage of steam into said chamber of said second cylinder;
   a second piston disposed within said chamber of said second cylinder, said second piston being formed with an internal auxiliary exhaust passage opening adjacent to a working surface of said second piston and opening adjacent to a piston surface adjacent an interior wall surface of said second cylinder, said auxiliary exhaust passage of said second piston registering with said exhaust port of said second cylinder during a part of the stroke of said second piston within said second cylinder;

a second auxiliary exhaust valve disposed within said chamber of said second cylinder and seated on said second piston for controlling the passage of exhaust through said auxiliary exhaust passage of said second piston; and second auxiliary exhaust valve actuating means actuated in response to the movement of said power conversion means for operating said auxiliary exhaust valve in response to the rate of reciprocation of said second piston for controlling the passage of exhaust through said auxiliary exhaust passage of said second piston.

11. The engine of claim 10 in which the first and second inlet valves respond to the rate of reciprocation of the respective pistons.

12. An engine as claimed in claim 11 and comprising output drive shaft means and in which said power conversion means is in the form of a swash plate and connected to said output drive shaft means for imparting rotation thereto.

13. The engine of claim 12 in which said swash plate includes cam surface means adapted for controlling the action of said first and second auxiliary exhaust valves on said first and second pistons respectively.

14. The engine of claim 13 in which the output drive shaft means is adapted for controlling the first and the second inlet valves.

15. The engine of claim 14 in which the first and second pistons engage intermediate piston rods extending from the first and second pistons to crosshead means engaging said swash plate.

16. The engine of claim 15 in which the output drive shaft means carries cam member means extending to and controlling actuation of the first and second inlet valves.

17. The engine of claim 15 in which the crosshead means and swash plate means are included in an integral output drive housing remote from the first and second cylinders.

18. The engine of claim 17 further including guide sleeve means for guiding the crosshead means and minimizing side thrust on the piston rods.

References Cited

UNITED STATES PATENTS

| | | | |
|---|---|---|---|
| 1,214,858 | 2/1917 | Wilkin | 91—243 |
| 1,594,082 | 7/1926 | Walker | 91—243 |
| 2,490,644 | 12/1949 | McGrew | 91—243 |
| 3,071,921 | 1/1963 | Wild | 91—243 |
| 3,370,510 | 2/1968 | Bunyan | 91—175 |
| 3,397,619 | 8/1968 | Sturtevant | 91—175 |

PAUL E. MASLOUSKY, Primary Examiner

U.S. Cl. X.R.

91—243, 401, 402, 449, 499